(12) United States Patent
Lv et al.

(10) Patent No.: US 12,531,055 B2
(45) Date of Patent: *Jan. 20, 2026

(54) DISPLAYING A TRANSCRIPTION WITH ADJUSTABLE TRANSPARENCY

(71) Applicant: Omnissa, LLC, Mountain View, CA (US)

(72) Inventors: Lin Lv, Beijing (CN); Yunxia Cheng, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 18/119,293

(22) Filed: Mar. 9, 2023

(65) Prior Publication Data
US 2024/0233710 A1  Jul. 11, 2024

(30) Foreign Application Priority Data

Jan. 9, 2023 (WO) ................ PCT/CN2023/071267

(51) Int. Cl.
*G10L 15/08* (2006.01)
*G06F 9/451* (2018.01)

(52) U.S. Cl.
CPC .............. *G10L 15/08* (2013.01); *G06F 9/452* (2018.02)

(58) Field of Classification Search
CPC .... G06F 9/452; G06F 3/0481; G06F 3/04845; G06F 3/04547; G06F 2203/04804; G10L 15/26
See application file for complete search history.

(56) References Cited

U.S. PATENT DOCUMENTS

| 7,171,558 | B1* | 1/2007 | Mourad | G06F 21/10 713/168 |
| 2002/0161996 | A1* | 10/2002 | Koved | G06F 21/52 713/150 |
| 2009/0276771 | A1* | 11/2009 | Nickolov | H04L 67/34 718/1 |
| 2011/0074813 | A1* | 3/2011 | Masumoto | G06T 15/503 345/629 |
| 2011/0246904 | A1* | 10/2011 | Pinto | G06F 9/452 715/740 |
| 2013/0125046 | A1* | 5/2013 | Gaul | G06F 3/0484 715/790 |
| 2013/0290856 | A1* | 10/2013 | Beveridge | G06F 3/1454 715/740 |
| 2014/0267090 | A1* | 9/2014 | Heyman | G06F 3/0481 345/173 |

(Continued)

OTHER PUBLICATIONS

Github, Inc., "The Live Transcribe Speech Engine", available at <URL: https://github.com/google/live-transcribe-speech-engine>, Apr. 22, 2021, 14 pages.

(Continued)

*Primary Examiner* — Jakieda R Jackson
(74) *Attorney, Agent, or Firm* — Kim & Stewart LLP

(57) ABSTRACT

A transcription, such as text of audio occurring at to a remote desktop and which may include a translation, may be presented concurrently with an image of the remote desktop on an unused area of a display screen. The transcription may be presented with a selectable and adjustable transparency, and can continue to be presented after the image of the remote desktop is minimized.

18 Claims, 10 Drawing Sheets

(56) References Cited

U.S. PATENT DOCUMENTS

2014/0313218 A1* 10/2014 Lee .......................... G09G 5/10
                                                                345/589
2023/0343330 A1* 10/2023 Machanavajhala ..... G10L 15/26
2023/0353835 A1* 11/2023 Springer ............... G06F 3/0486

OTHER PUBLICATIONS

Github, Inc., "AutoLingo", available at <URL: https://github.com/AutoLingo/autolingo>, Apr. 21, 2017, 4 pages.
Microsoft, Inc., "Programming reference for the Win32 API", available at <URL: https://learn.microsoft.com/en-us/windows/win32/api/>, 2023, 6 pages.
Non-Published Commonly Owned U.S. Appl. No. 18/128,247, filed Mar. 30, 2023 , 42 pages, VMware, Inc.
Non-Published Commonly Owned U.S. Appl. No. 18/128,248, filed Mar. 30, 2023, 40 pages, VMware, Inc.

* cited by examiner

DISPLAYING A TRANSCRIPTION WITH ADJUSTABLE TRANSPARENCY

CROSS-REFERENCE TO RELATED APPLICATIONS

The present application claims the benefit of Patent Cooperation Treaty (PCT) Application No. PCT/CN2023/071267, filed Jan. 9, 2023. The present application is also related in subject matter to U.S. patent application Ser. No. 18/128,247, entitled "DISPLAYING REMOTE DESKTOP INFORMATION WITH ADJUSTABLE TRANSPARENCY", filed Mar. 30, 2023, now U.S. Pat. No. 12,164,942, issued Dec. 10, 2024, and to U.S. patent application Ser. No. 18/128,248, entitled "DISPLAYING A REMOTE DESKTOP WITH CONTROLLABLE TRANSPARENCY", filed Mar. 30, 2023, now U.S. Pat. No. 12,399,617, issued Aug. 26, 2025. The aforementioned PCT application and US patent applications are incorporated herein by reference in their entirety.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources in a virtualized computing environment may include central processing unit (CPU) resources, memory resources, storage resources, network resources, etc.

One example use of a virtualized computing environment is for a virtual desktop infrastructure (VDI) implementation, which is a type of desktop virtualization that allows a remote desktop to run on VMs that are provided by a hypervisor on a host. A user/client uses the operating system (OS) and applications (which reside and execute at the VM) via an endpoint device (local client device or local user device) of the user, just as if the OS/applications were actually running locally on the endpoint device, when in reality the OS/applications are running on the remote desktop.

Working remotely on a regular or occasional basis, such as via remote desktops rendered on laptops (or other endpoint device), has become common due to the flexibility and convenience. When a user is using a remote desktop with a multimedia presentation or other type of presentation that includes audio (e.g., such as when the user is attending an online conference call, playing back a video or audio, etc.), the user may wish to view a transcription (e.g., text shown on the display screen) of the audio in the presentation. However, it can be difficult to effectively and efficiently provide a transcription during a remote desktop session when a user is operating a remote desktop.

DETAILED DESCRIPTION

Figure 1:
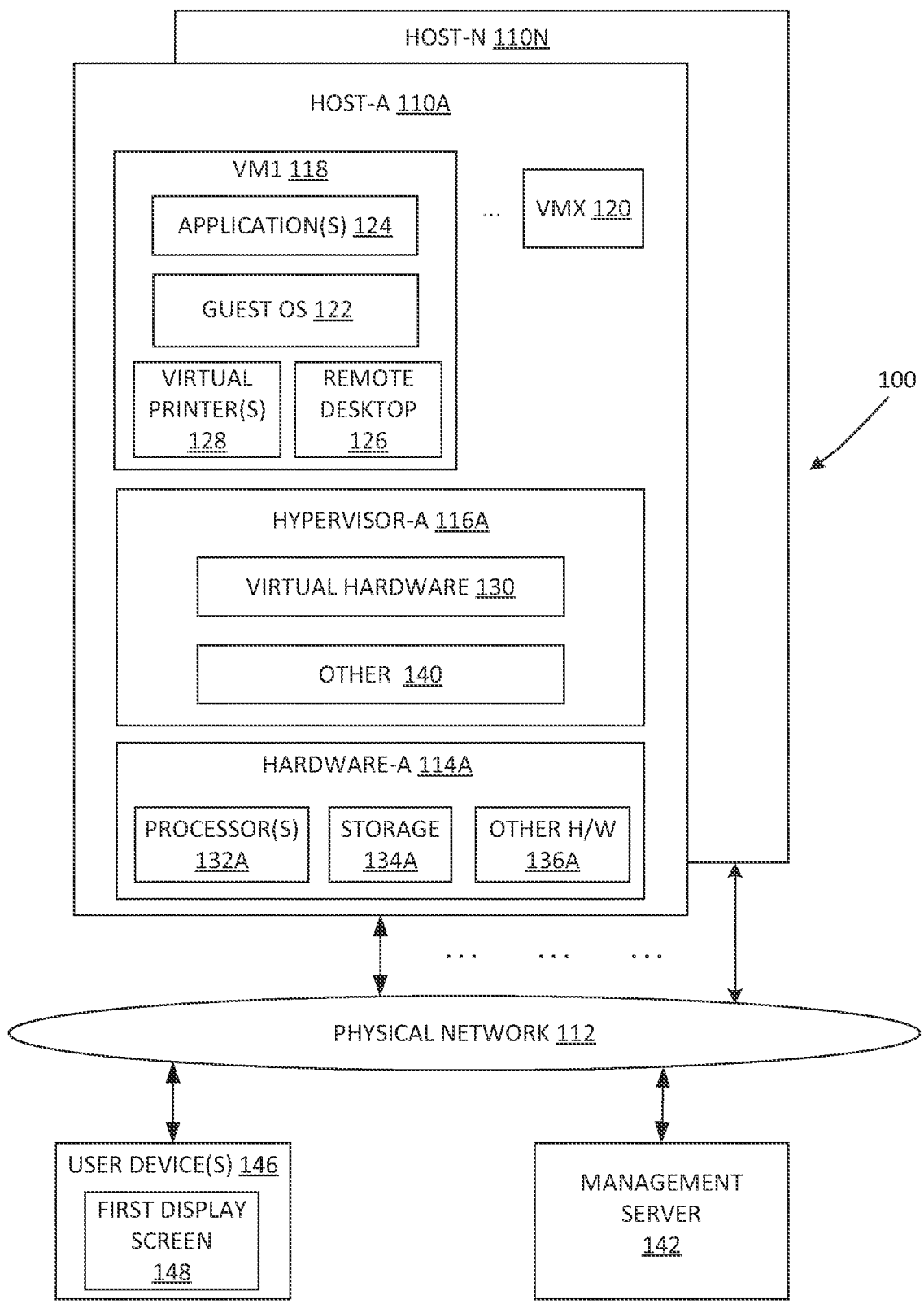
FIG. 1 is a schematic diagram illustrating an example virtualized computing environment that can implement a virtual desktop infrastructure (VDI) having capability to enable the transparent display of a transcription concurrently with operating a remote desktop.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses drawbacks associated with viewing some types of information (such as a transcription having text) concurrently with operating/using a remote desktop. For example and as previously explained above, a user may wish to view a transcription while using a remote desktop for a multimedia presentation or other type of visual presentation having audio. As an illustration, the user may be using an application provided by a remote desktop to attend a conference call (e.g., by using Microsoft Teams, Zoom, Slack, etc.), to play back video or audio (e.g., by using a media player), to stream a multimedia file, to play a game, and/or to otherwise view or listen to live or recorded content having audio. At least the following conditions may make it difficult to effectively present the audio to the user:
1. The audio on a remote desktop is unable to be redirected to a local client device for output/playback due to hardware or software limitations.
2. The user does not want to hear the audio since the user is present in a public place or does not have a headset.

3. The user can hear the audio from the remote desktop, but the user does not understand the audio since the user is not familiar with the language in the audio.

4. The user is deaf or hard of hearing.

With the above or other conditions, the user may prefer to see a transcription (such as a live or recorded transcription, close captioning, a subtitle, a translation, or other live or recorded textual or graphical presentation) of the audio that is occurring on the remote desktop. Although some multimedia applications (such as Zoom, YouTube, etc.) have the capability to provide a live transcription even for different languages, a disadvantage of these transcription capabilities is that the user has to keep focusing on the multimedia application to get the live transcription or translation. There is limited capability for the user to do perform certain tasks using the remote desktop (such as editing a document, surfing web pages, etc.), while still being able to view a transcription on a display screen that presents the remote desktop. Furthermore, the user may no longer be able to view the transcription if the user reverts back to a local desktop on the local client device to perform other tasks, such as when the user minimizes the window/image of the remote desktop.

Presentation of a Transcription with Variable Transparency

To address the above and other drawbacks, the embodiments disclosed herein leverage the unused areas of a local display screen to present a transcription, for viewing by a user that is operating a remote desktop or is otherwise logged into a remote desktop session. The transcription may be presented on the display screen with variable and adjustable transparency.

For example, for purposes of convenience and assistance when working remotely, users often connect their laptop (or other local client device) to a larger (second) display screen, since the (first) display screen of a laptop is often too small or too crowded for daily work that involves viewing a large amount of information, applications, etc. The larger second display screen (e.g., a 27- or 32-inch monitor or other size monitor) enables the display screen of the laptop to be extended or duplicated, so that the user can concurrently view multiple applications, pages, documents, or other types of information or content.

Figure 3:
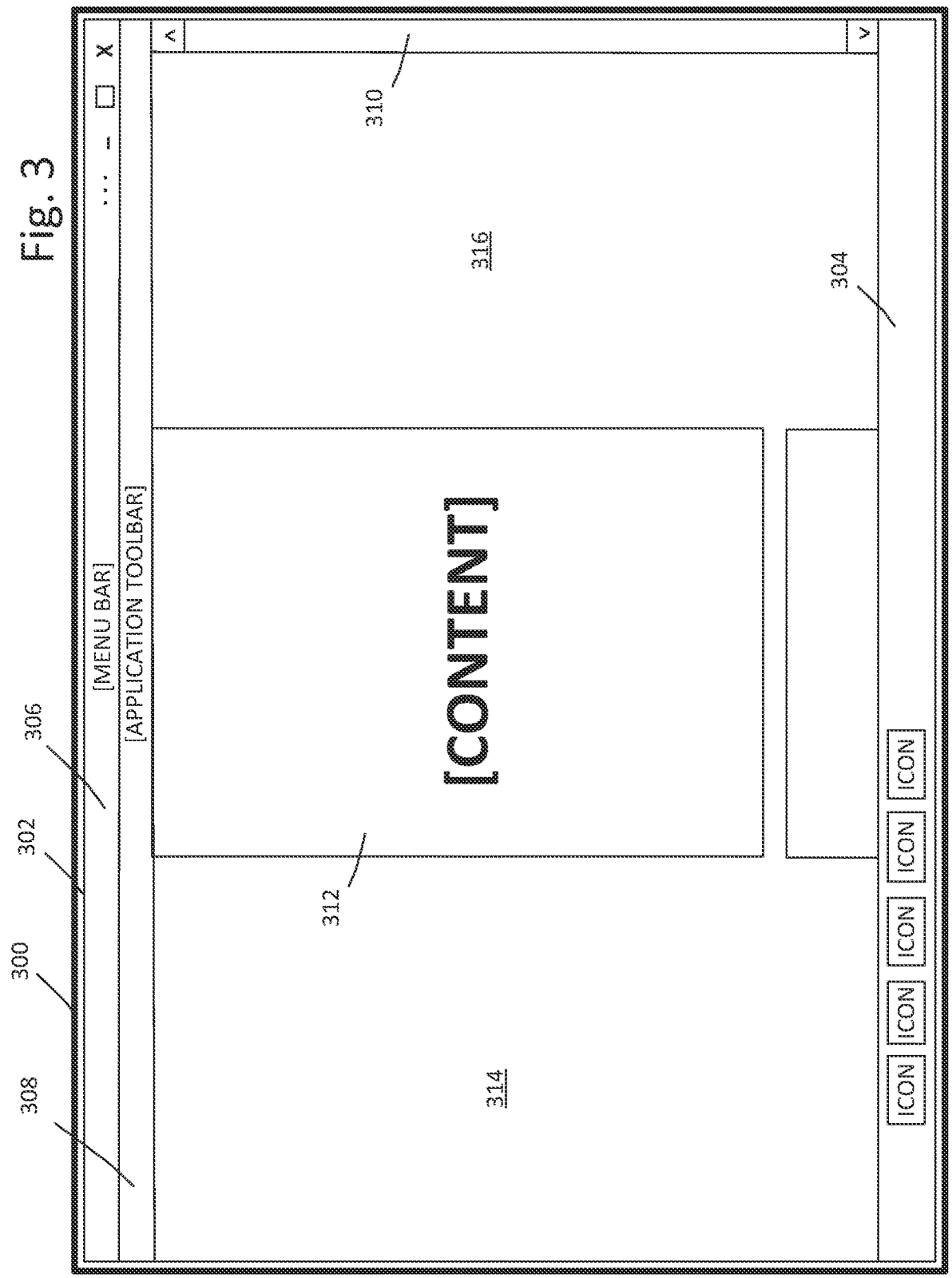
FIG. 3 is a diagram illustrating an example of an application file being presented on a display screen.

However, a large amount of the display area (real estate) of the second display screen is often unused, and so is typically wasted when working on a document, viewing a web page etc. For example, FIG. 3 is a diagram illustrating an example of an application file being presented on a display screen. Specifically, the user has logged into a remote desktop session and is using a display screen 300 as a second display screen connected to a first display screen (not shown in FIG. 3) of a laptop or other local client device.

The display screen 300 is rendering a remote desktop 302 as a remote display, which may include one or more bars, such as a task bar 304 and other graphics. A remote application (such as Microsoft Word), which is being accessed and used by the user via the remote desktop 302, is maximized and so fully occupies the real estate of the remote desktop 302. The remote application may display/include one or more bars (such as a menu bar 306, a tool bar 308, and a scroll bar 310) and a file (such as pages of a Microsoft Word document 312).

As depicted in the example of FIG. 3, the document 312 may be displayed in the center (a first region) of the remote display area of the remote desktop 302, while areas 314 and 316 (second regions) to the left and right (respectively) of the document 312 may be unused (e.g., not occupied by the document 312 and/or not used by other components of the remote application), and so the areas 314 and 316 are wasted.

While FIG. 3 depicts an example of a document 312 of a remote application and unused areas 314 and 316 of the display screen 300, analogous situations may occur with other applications, tools, etc. that are used via the remote desktop 302. For instance, a web page (or other file/content provided by the remote desktop 302) may be rendered in the left, center, right, etc. regions of the display screen 300, while other regions/areas of the display screen 300 may be unoccupied by the file and so are unused. In some situations, the file (e.g., a web page) may occupy approximately 50% of the display screen 300, thereby wasting the other approximate 50% of the display screen 300.

The embodiments described herein use the otherwise unused/wasted areas (e.g., one or more of the areas 314 and 316 or other areas) of the display screen 300 to present a transcription that may include text, graphics, and/or other types of information. Thus, such areas are used to present information that is of interest to the user and such areas are not wasted. Such transcription presented in these areas may be unrelated or related to the other content (e.g., the document 312 of FIG. 3 as an example) that is presented on the display screen 300, and may be presented with user-selectable transparencies.

Figure 4:
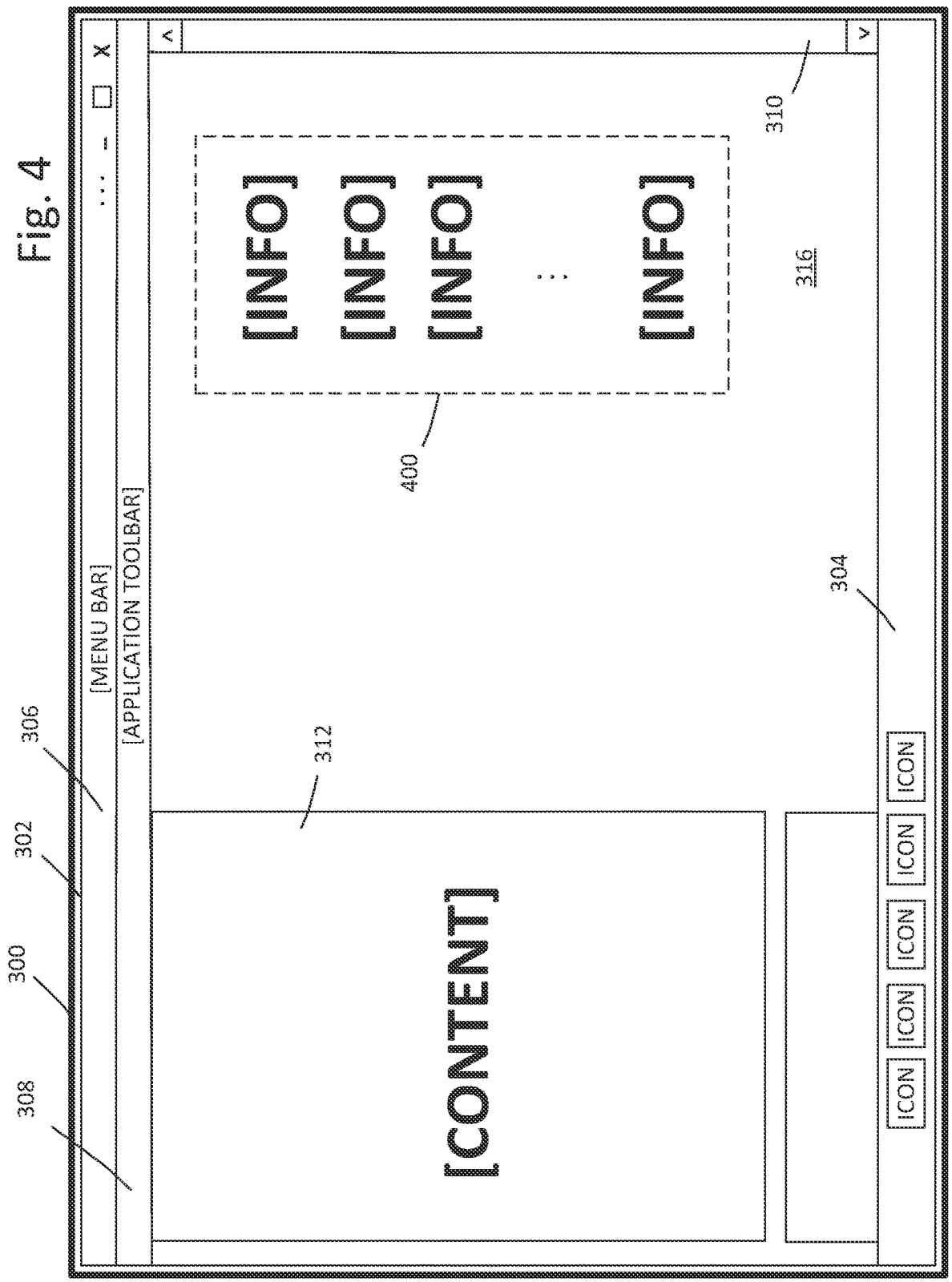
FIG. 4-6 are diagrams illustrating examples of different transparencies for a transcription presented on the display screen of FIG. 3.
Figure 5:
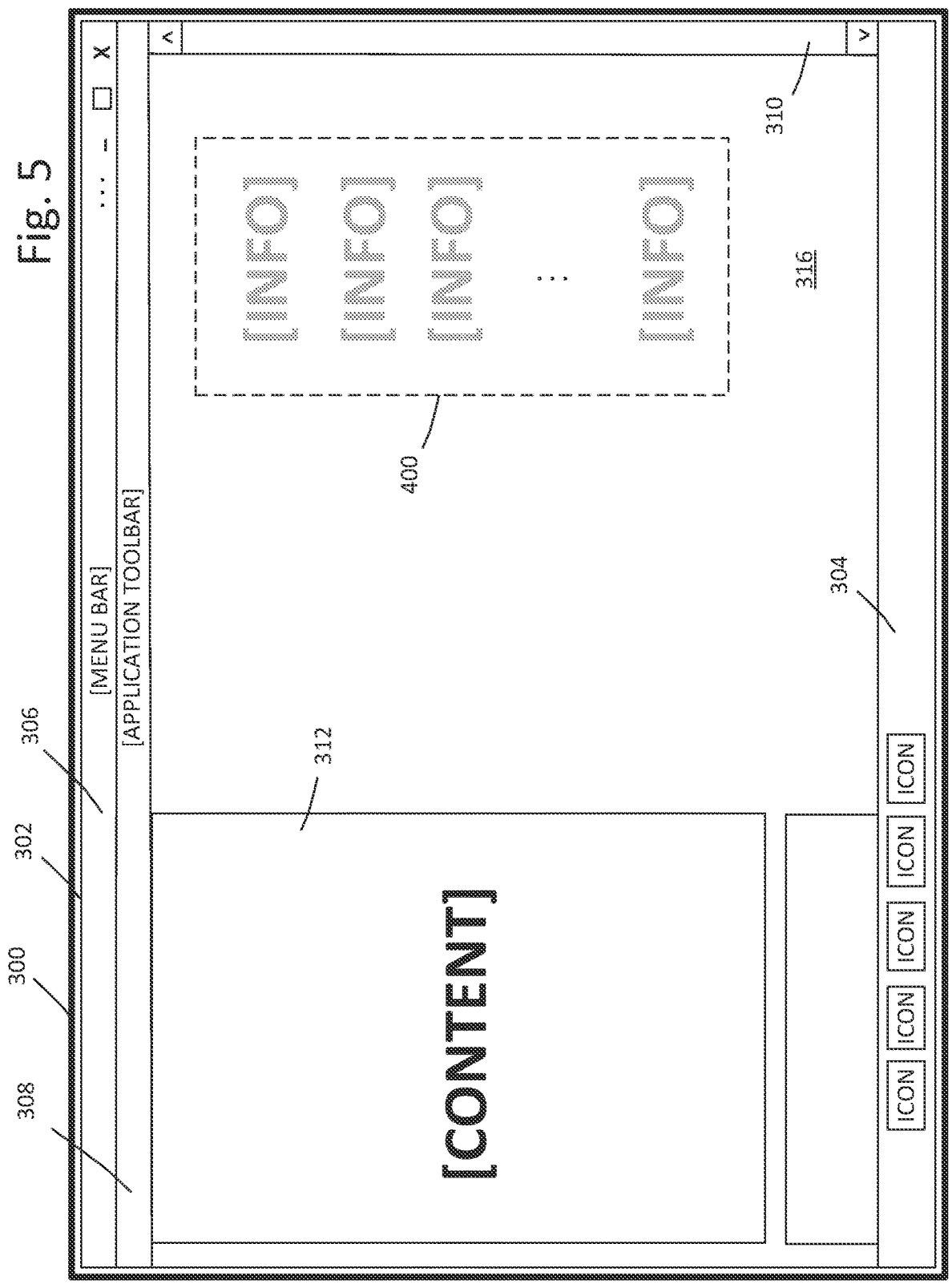
Figure 6:
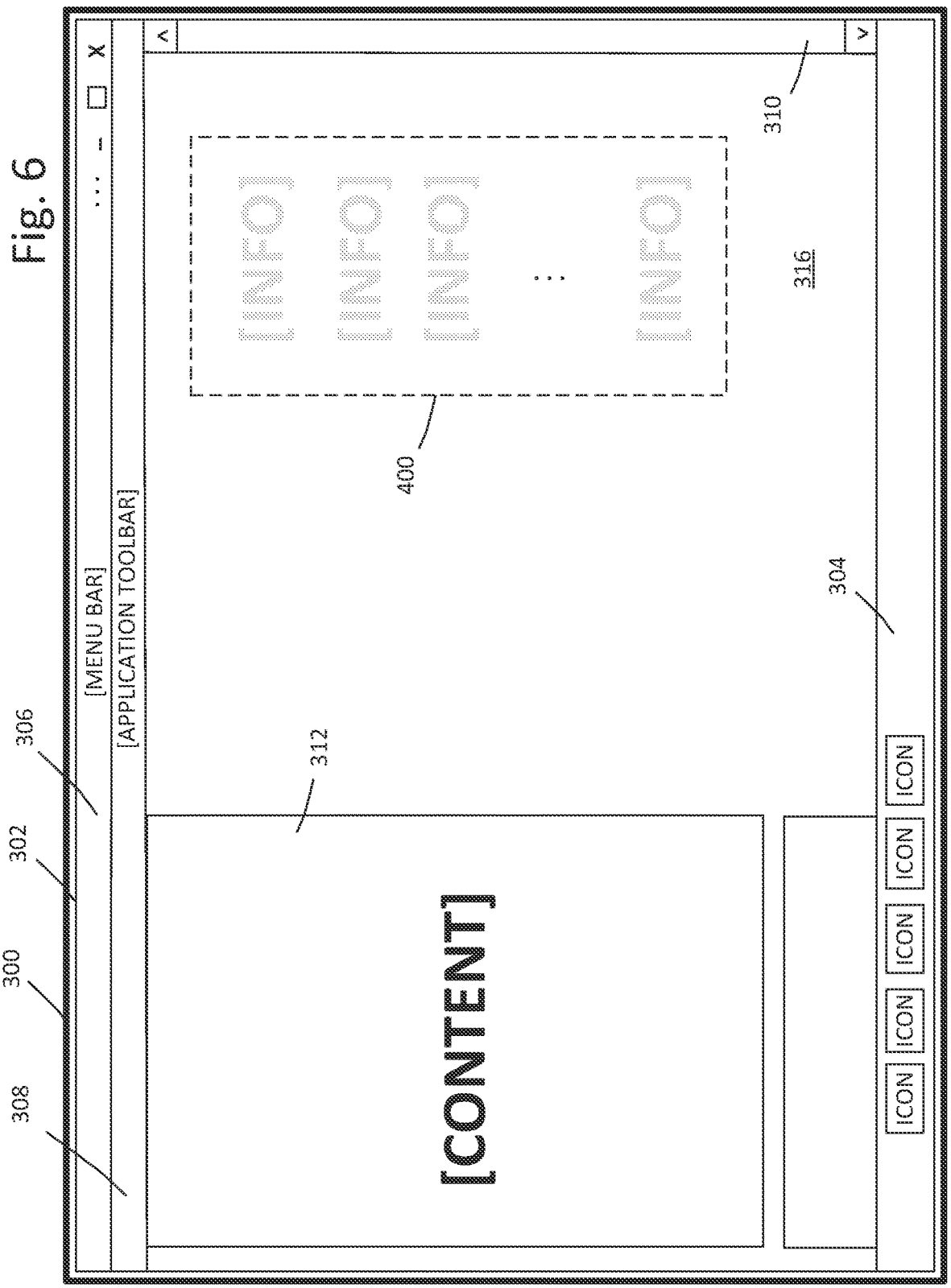

FIGS. 4-6 are diagrams illustrating examples of different transparencies for a transcription 400 presented on the display screen 300 of FIG. 3. More specifically, FIGS. 4-6 illustrate the transcription 400 concurrently being presented as an image along with the document 312 on the (previously unused) area(s) of the display screen 300. The transcription 400 may be presented with varied/different transparencies, and may include one or more pieces of information. These pieces of information may include text or other content of a single transcription corresponding to a single audio presentation occurring on the remote desktop, or multiple text or other content corresponding to respective multiple audio presentations occurring on the remote desktop. Thus, the transcription 400 is intended to represent at least one transcription, and can include multiple transcriptions if the user so desires to view multiple transcriptions concurrently.

Referring first to FIG. 4 as an example, the document 312 of the remote application is displayed in the left area of the display screen 300, while the transcription 400 is displayed in the right area 316 (which was previously unused in FIG. 3) of the display screen 300. The transcription 400 can include text, graphics, or other type of visual information that can be presented for viewing. The amount or level of transparency of the transcription 400 can be set by the user to be between a range between 0% and 100%, with the image being invisible at 100% transparency and no transparency of the image at 0% transparency. The user may set a particular transparency, for example, dependent upon the amount of attention or distraction that the user wishes for the transcription 400.

In the example of FIG. 4, the transparency of the transcription 400 has been set at 0% transparency, and so the visibility of the transcription 400 is at a maximum (fully visible and no transparency). This 0% transparency is symbolically represented in FIG. 4 by black text for the transcription 400.

In the example of FIG. 5, the transparency of the transcription 400 has been set to a higher transparency such as 50% transparency, and so the visibility of the transcription 400 is between no transparency and invisibility. This 50% transparency is symbolically represented in FIG. 5 by gray text for the transcription 400, which is lighter in shade relative to the black text for the transcription 400 in FIG. 4.

In the example of FIG. 6, the transparency of the transcription 400 has been set to an even higher transparency such as 75% transparency, and so the visibility of the transcription 400 is approaching invisibility at 100% transparency. This 75% transparency is symbolically represented in FIG. 6 by gray text for the transcription 400, which is still lighter in shade relative to the gray text for the transcription 400 in FIG. 5.

In the examples shown in FIGS. 4-6, the transparency of the background behind the transcription 400 is at 100%, while the transcription 400 is presented at variable transparencies. In some embodiments, the transparency of the background may also be varied, or may be kept fixed at 100% transparency or other transparency level.

The transcription 400 may be a transcription of live or recorded audio occurring at the remote desktop, such as a multimedia file that is being played back (via a multimedia player application) at the remote desktop 302 during a remote desktop session, as one example. The transcription 400 may be a live transcription, a transcription of recorded audio, a translation, or other type of transcription(s) having text.

For the transcription 400, some pieces of information may be highlighted or otherwise have a different appearance in some embodiments, so as to more readily catch the user's attention or to differentiate from each other. For example, if multiple transcriptions are being displayed (e.g., from different multiple applications, files, audio sources, etc.), some transcriptions may have highlighting or some other different appearance than other transcriptions. This highlighting may take the form of a different text color, different background color, animation (such as flashing or moving text), larger font size, graphical indicators, different transparency (e.g., more visible relative to other transparent text), or other visual effect that is different than the other transcriptions, so as to more readily catch the user's attention or to facilitate identification/differentiation.

Thus, the embodiments described herein address the needs of users by leveraging the unused area on a display screen to display a transcription of audio occurring on a remote desktop, with the transcription being in the form of an image displayed on top of the window of a remote desktop window. The transcription may have a 100% transparent (or other transparency level) background and may have transparent text that can be varied/adjusted in transparency. As a result, when there is an audio stream or other audio content occurring on the remote desktop, the transcription may be displayed within the (previously) unused area on top of the window of the remote desktop. In some embodiments, the text of the transcription appears above (e.g., is superimposed over) the window of the remote desktop as an image with adjustable transparency, and is not clickable or interactable.

Figure 7:
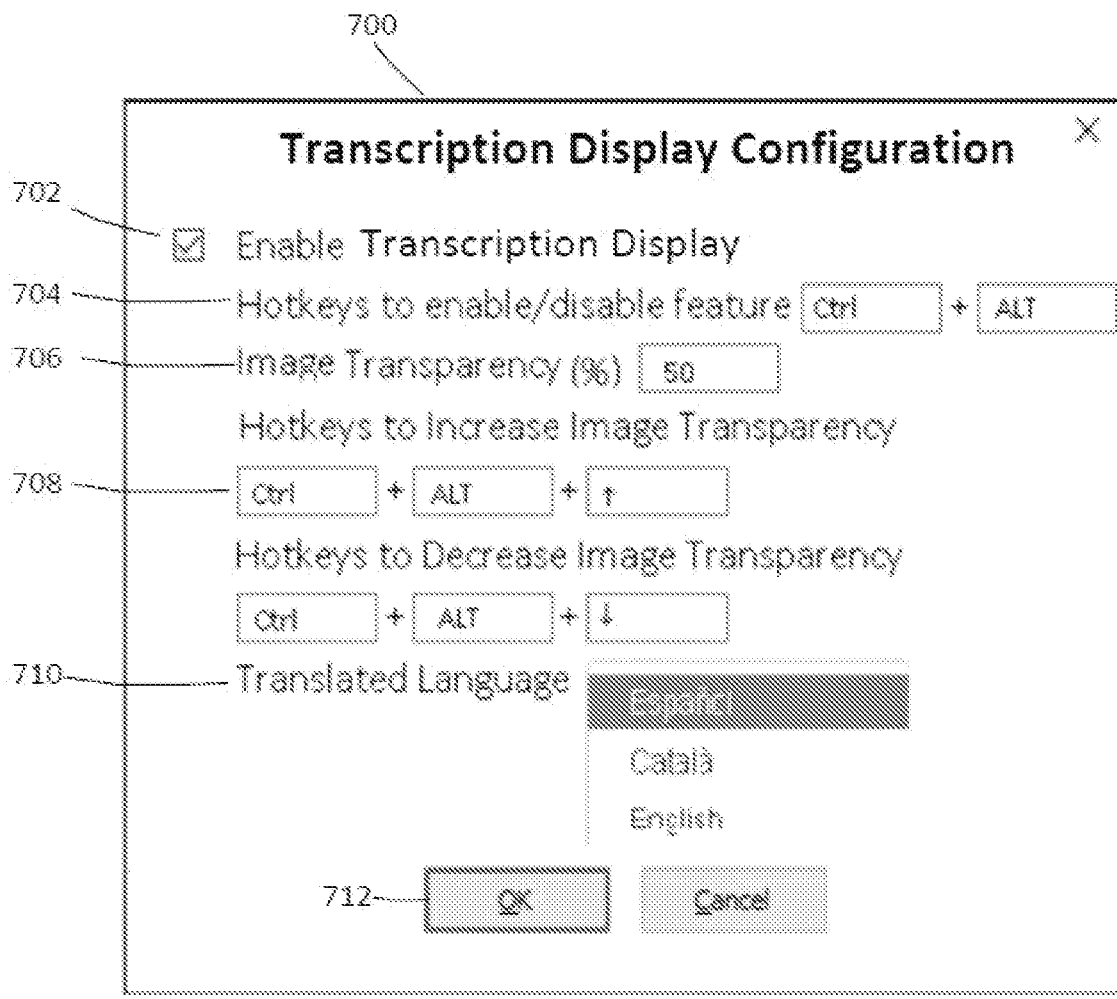
FIG. 7 shows an example user interface window that may be used to enable and configure the presentation of a transcription with variable transparency.

FIG. 7 shows an example user interface (UI) window 700 that may be used to enable and configure the presentation of a transcription with variable transparency, such as depicted in FIGS. 4-6. The user may access the UI window 700 by launching client software (e.g., a remote desktop application that is installed in the local client device) and then opening the UI window 700 via a configuration menu selection or other configuration option.

The UI window 700 may present various UI elements, such as selection boxes, fillable fields, menus, prompts, buttons, etc. For example, the UI window 700 may include a UI element 702 that may be used by the user to enable or disable the feature of being able to present/display a transparent transcription on the display screen 300. Alternatively or additionally, a UI element 704 enables the user to specify hotkeys (e.g., CTRL and ALT keys) that may be actuated to enable or disable (e.g., to turn on or turn off) the presentation of a transparent transcription.

The user may specify the level of transparency of an image of the transcription via a UI element 706. UI elements 708 enable the user to specify hotkeys for changing/adjusting the transparency of the image of the transcription. For example, the user may specify CTRL+ALT+arrow up keys as the hotkeys to increase the image transparency, and CTRL+ALT+arrow down keys as the hotkeys to decrease the image transparency.

A UI element 710 may be provided to enable the user to select a particular language for a translation, if the audio is in a language that the user is unfamiliar with. Alternatively or additionally, the UI element 710 may be provided to enable the user to select a particular language for the transcription, such as language for close captioning or subtitles that may not necessarily involve a translation.

Other possible examples of UI elements for UI window 700 in other embodiments may include but are not limited to: a UI element to specify the size (e.g., length and width) of the image of the transcription 400, a UI element to specify whether the transcription 400 is to be presented on the first display screen or on the second display screen or other display screen (if present), a UI element to specify the area (e.g., left, center, or right) of the display screen where the transcription 400 is to be presented, other visual appearance characteristics of the transcription (such as color, font, highlighting, animation, speed, and so forth), etc. These are just a few examples of the settings that may be configured for the transcription via at least one UI window 700.

After the user clicks an OK button 712 to complete the configuration, the feature of displaying a transcription is configured and enabled. When the user connects the local client device to a remote desktop and there is audio (e.g., an audio stream) occurring at the remote desktop and the use has turned on the feature, the audio is redirected to the remote desktop client installed at the local client device so that the transcription 400 is displayed on the display screen 300 as a transparent image above the remote desktop (such as shown in FIGS. 4-6) with the specified transparency, with a default (or specified) size and position on the display screen 300. By default in some embodiments (e.g., if a specific area for display is not selected via the UI window 700), an unused area of the display screen 300 is automatically detected and the transcription 400 is displayed therein. In other embodiments, the transcription 400 may be displayed on the right side of the remote desktop 302 as a default if a specific area for display is not otherwise selected via the UI window 700.

Users can modify the default display region/area for the transcription 400 by using hotkeys and a mouse. For example, to change the display area of live captioning (such as Live Transcribe), the user may first press hotkeys (e.g., CTRL+ALT keys on a keyboard) that are defined in the UI window 700, and concurrently left click a mouse button and drag a mouse to draw/define a region on the display screen 300. When the user releases both hotkeys on the keyboard and the mouse button, the newly defined region takes effect with transcription 400 displayed therein.

According to various embodiments, the defined region for displaying the transcription 400 may be smaller than the remote desktop 302. The information will not be covered by any remote (guest) applications being used via the remote desktop since the transcription 400 is displayed as an image above the remote desktop 302.

In some embodiments, all content/information contained in a single transcription 400 will have the same transparency as specified via the UI window 700 and is displayed in the same area of the display screen, which may also be specified via the UI window 700. In other embodiments, different pieces of content/information contained in a single transcription 400 may have corresponding different transparencies or other appearance specified via the UI window 700. For example, the audio of different persons participating in a meeting may be displayed with more or less transparency (and/or other different color, highlighting, etc.) relative to each other, so as to better distinguish one speaker from another speaker on the display screen 300 for the user. In some embodiments, the UI window 700 may also be used to specify the same area or a different area on the display screen 300 to respectively display multiple different transcriptions that may be concurrently available, and with different or same transparencies or other appearance as desired by the user. Other variations in the configuration of how and where to display the transcription(s) are possible.

According to various embodiments, even if the user minimizes the window of the remote desktop 302, the transcription 400 remains displayed on the display screen 300. This feature enables the user to continue viewing the transcription 400, such as if the user switches to working on a local application on a local desktop and still wishes to concurrently view the transcription. When the remote desktop 302 is minimized in this scenario, the transparency of the transcription 400 can be kept at the same level as when the remote desktop 302 is not minimized. In other embodiments, the transparency of the transcription 400 can be changed (e.g., increased or decreased) when the remote desktop 302 is minimized.

To assist in further explaining the details of how information (e.g., the transcription 400) may be presented on the display screen 300 with varied transparency during a remote desktop session, a description is provided next below regarding a computing environment and client and agent components that may be provided to support the capability to present the information.

Computing Environment

FIG. 1 is a schematic diagram illustrating an example virtualized computing environment 100 that can implement a virtual desktop infrastructure (VDI) having capability to enable the transparent display of a transcription concurrently with operating a remote desktop. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . VMX 120, wherein X (as well as N) is an integer greater than or equal to 1. In practice, the virtualized computing environment 100 may include any number of hosts (also known as computing devices, host computers, host devices, physical servers, server systems, physical machines, etc.), wherein each host may be supporting tens or hundreds of virtual machines. For the sake of simplicity, the details of only the single VM1 118 are shown and described herein.

VM1 118 may be an agent-side VM that includes a guest operating system (OS) 122 and one or more guest applications 124 (e.g., remote applications and their corresponding processes) that run on top of the guest OS 122. Using the guest OS 122 and/or other resources of VM1 118 and the host-A 110A, VM1 118 may generate one or more remote desktops 126 (e.g., the remote desktop 302 or other virtual desktops) that is operated by and accessible to one or more client-side user device(s) 146 (e.g., a local client device) via the physical network 112. One or more virtual printers 128 also may be instantiated in VM1 118 and/or elsewhere in the host-A 110A, and may correspond to one or more physical printers (not shown) connected to the user device 146 at the client side. VM1 118 may include other elements, such as code and related data (including data structures), engines, etc., which will not be explained herein in further detail, for the sake of brevity. The user device 146 may include a first display screen 148 and other components (explained in more detail in FIGS. 2 and 8) to support the use of the user device 146 in cooperation with the virtual desktop 126 and other elements of VM1 118. The first display screen 148 or some other display screen may render the UI window 700 of FIG. 7 when the user device 146 launches a remote desktop application.

According to various embodiments, VM1 118 may operate as an agent that provides the remote desktop 126 (and other remote desktop features) to one or more of the user device 146. For instance, the agent can cooperate with client software (referred to at times herein as a remote desktop application, client application, remote desktop client, or client, installed at the user device 146) to establish and maintain a remote desktop connection between VM1 118 and the user device 146 for purposes of enabling the user to operate the user device 146 in order to access and use the remote desktop 126. In some embodiments, the agent can be a sub-component of VM1 118. Examples of the agent and client software are the Horizon agent and the Horizon client, respectively, of VMware, Inc. of Palo Alto, California. One or more connection servers 216 (shown in FIG. 2) can broker or otherwise manage communications between the agent (e.g., a Horizon agent or other analogous remote desktop agent) and the client software (e.g., a Horizon client or other analogous remote desktop client) over a VDI connection 208 (also shown in FIG. 2) provided by the physical network 112. A management server 142 and/or other server(s)/device(s) can operate as the connection server in some implementations.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs. The hypervisor-A 116A may include other elements (shown generally at 140), including tools to provide resources for and to otherwise support the operation of the VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and remote application(s) in the virtual machine, such as the guest OS 122 and the guest application(s) 124 (e.g., a word processing application, accounting software, a browser, etc.) in VM1 118. Corresponding to the hardware 114A, the virtual hardware 130 may include a virtual CPU, a virtual memory, a virtual disk, a virtual network interface controller (VNIC), etc.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster.

The management server 142 may be communicatively coupled to host-A 110A host-N 110N (and hence communicatively coupled to the virtual machines, hypervisors, hardware, etc.) via the physical network 112. In some embodiments, the functionality of the management server 142 may be implemented in any of host-A 110A host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Figure 2:
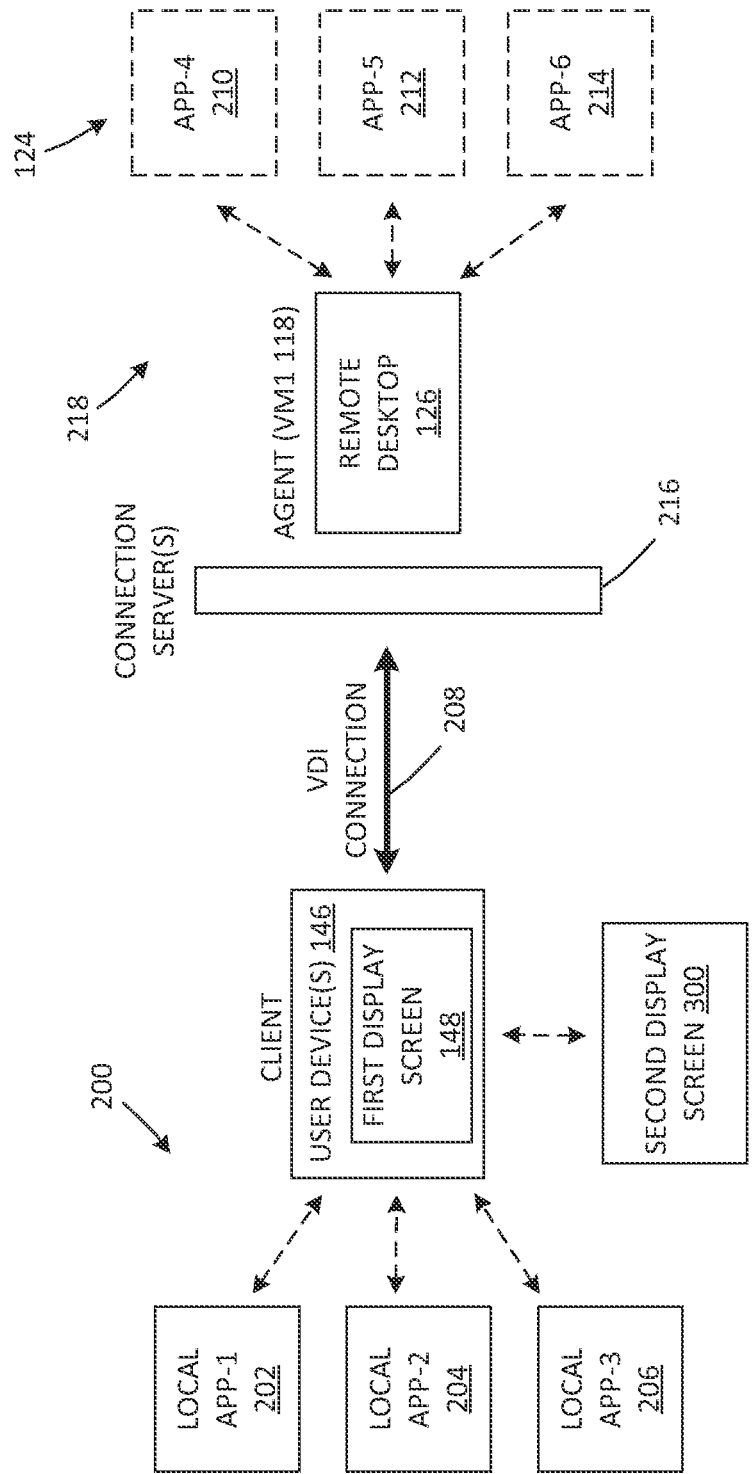
FIG. 2 is a schematic diagram illustrating client and agent devices for the virtualized computing environment of FIG. 1.

FIG. 2 is a schematic diagram illustrating client and agent devices for the virtualized computing environment 100 of FIG. 1. More specifically, FIG. 2 shows a client (e.g., a Horizon client or other analogous remote desktop client running on the user device 146), an agent (e.g., the VM1 118 and/or a component thereof, such as a Horizon agent or other analogous remote desktop agent, that provides the remote desktop 126 and which runs on a host), and their associated remote applications that may be displayed on their respective desktops (remote displays).

At a client side 200, the user device 146 may have local applications (APPs) installed on it. These applications may include a local APP-1 202, a local APP-2 204, a local APP-3 206, etc. These local applications (e.g., their respective icons or launched files/interfaces) may in turn be presented on a local desktop rendered on the first display screen 148 of the user device 146. Examples of these local applications may include but not be limited to Slack, Microsoft Teams, Microsoft Outlook, and/or other types of messaging/collaboration applications, as well as other locally installed applications such as a calendar application, word processing application, spreadsheet application, games, browser, etc.

One or more additional (second) display screens, such as the display screen 300 of FIGS. 3-6, may be connected to the user device 146. The display screen 300 may have a larger display area than the first display screen 148. A remote desktop and its applications may be displayed on either or both of the display screens 148 and 300, concurrently with or without local applications/content also being displayed. The user may select one of the display screens 148 and 300 to be a primary display screen, and may select the other display screen to be a secondary display screen. Various display configurations and capabilities may be provided.

The remote desktop client installed at the user device 146 may use one or more VDI connections 208 to establish and conduct a remote desktop session with the VDI at an agent side 218. One or more connection servers 216 at the agent side 218 may manage these connections to the remote desktops 126 (e.g., for brokering communications, load balancing purposes, etc.).

At the agent side 218, the remote desktop 126 may provide remote applications installed/running thereon (e.g., the guest applications 124 of FIG. 1). These applications on the remote desktop 126 may include an APP-4 210, an APP-5 212, an APP-6 214, etc. These applications (e.g., their respective icons or launched files/interfaces) may in turn be presented on the remote desktop 126 rendered on the display screen 300 or 148 of the user device 146 (e.g., the remote desktop 302 shown in FIGS. 3-6), when the user device 146 accesses the remote desktop 126. In some embodiments, one or more of the APP-4 210, an APP-5 212, an APP-6 214, etc. may be a browser, multimedia player, online meeting platform, communication application, electronic game, or other type of application or tool that may be a source of audio that can be transcribed into text.

Client and Agent for Presentation of a Transcription with Variable Transparency

Figure 8:
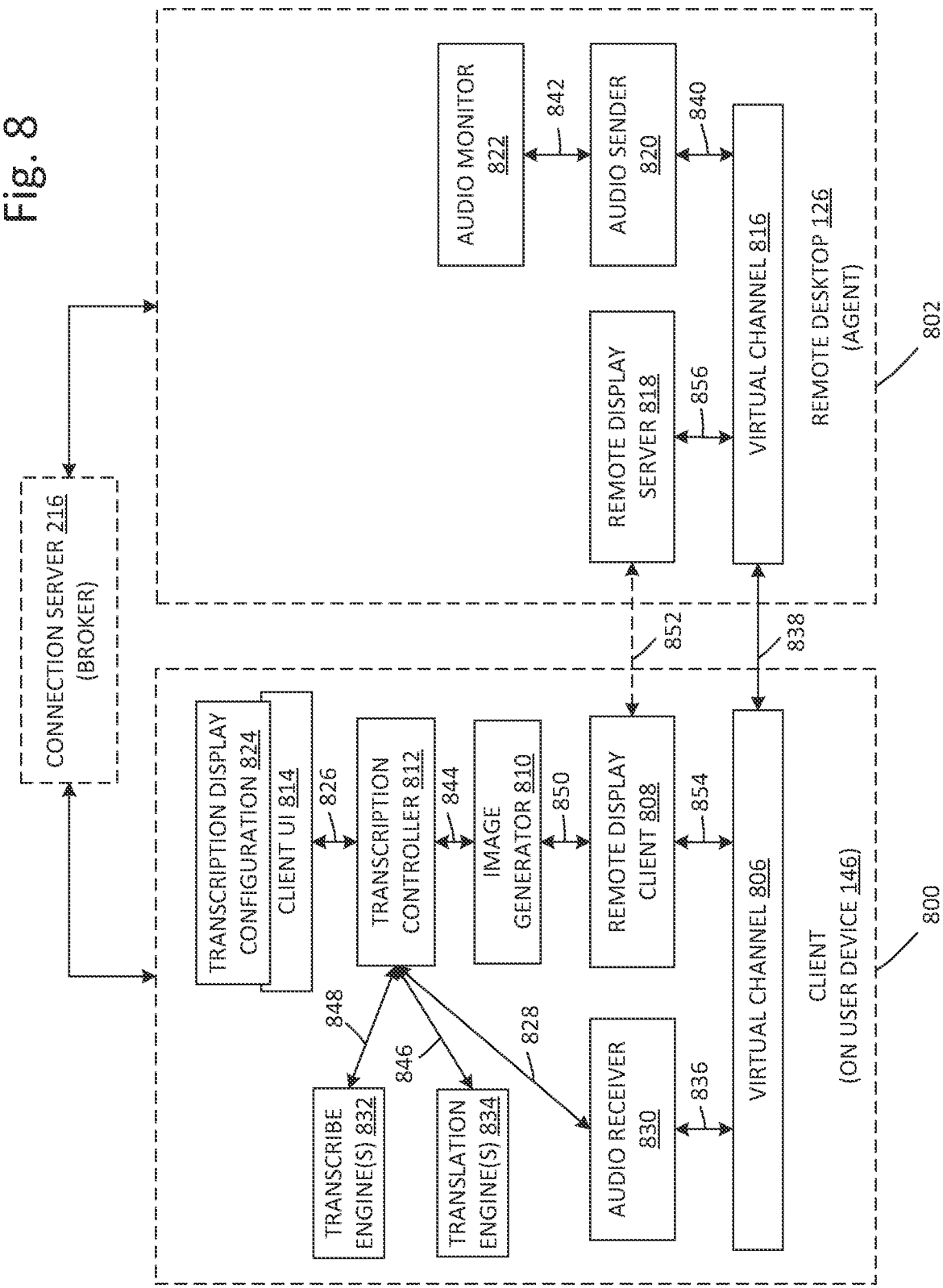
FIG. 8 is a schematic diagram illustrating components of a client and agent that cooperate to enable presentation of a transcription with variable transparency.

FIG. 8 is a schematic diagram illustrating components of a client and an agent that cooperate to enable presentation of a transcription with variable transparency. More specifically, FIG. 8 shows example components of a remote desktop client 800 (e.g., a Horizon client or other analogous remote desktop client), a remote desktop agent 802 (e.g., a Horizon agent or other analogous remote desktop agent), and other components/devices of FIG. 2 that may support the capability to present one or more transcriptions (e.g., the transcription 400) on a display screen (e.g., the display screen 300) such as depicted in FIGS. 4-6 above. Various components of the client, agent, etc. of FIG. 8 may be embodied as software or other computer-readable instructions stored on computer-readable media and executable by one or more processors, may be embodied in hardware, and/or may be embodied as a combination of hardware and software.

The client 800 may reside on the user device 146 at the client side. The agent 802 resides on a host at the agent side and is configured to provide one or more remote desktops 126 (e.g., the remote desktop 302) and related functionality to the client 800. The connection server 216 operates to broker communications between the agent 802 and the client 800.

The client 800 may comprise, among other things, various components such as a virtual channel 806, a remote display client 808, an image generator 810, a transcription controller 812, a client UI 814, an audio receiver 830, and one or more engines including a transcribe engine 832 and a translation engine 834. The agent 802, may comprise, among other things, various components such as a virtual channel 816, a remote display server 818, an audio sender 820, and an audio monitor 822.

Transcription display configuration settings 824 may be provided/specified using the UI window 700, and are accessible and used by the client UI 814. In some embodiments, the client UI 814 may include or provide the UI window 700. As previously described above, the user may provide the configuration settings 824 (via the UI window 700) to enable/disable the presentation of the transcription 400, as well as to specify other configuration details such as the transparency of the transcription 400, the image size of the transcription 400, the hotkeys to enable/disable the presentation of the transcription 400 or to increase/decrease the transparency, a translation language, other appearance characteristic, etc. The configuration settings 824 may be stored locally at the user device 146, and so users may perform re-configuration if some other local client device is used for remote desktop sessions.

If the user specifies or changes the configuration settings 824 with respect to the details of the transcription 400 to display, such as by using the UI window 700 to make selections, edits, inputs, etc. and then clicking the OK button 712, the transcription controller 812 may be notified of such changes, selections, or other inputs at 826 via the client UI 814. The transcription controller 812 then coordinates the other components at the client 800 to apply the configuration settings 824 that have been made by the user.

According to various embodiments, the transcription controller 812 may be configured to perform operations associated with controlling the presentation of the transcription 400 (which may include translations). Such operations performed by the transcription controller 812 to coordinate with other components of the client 800 to present the transcription 400 may include one or more of the following:

1. Apply the configuration settings 824 provided (at 826) via the client UI 814 by working with other components of the client 800. For example, if the user enables/disables the presentation of the transcription 400 via the UI window 700, the transcription controller 812 informs (at 828) the audio receiver 830 of this enablement/disablement. The audio receiver 830 then informs (at 836, 838, and 840, or via some other communication link/path) the audio sender 820 at the agent 802, which will then instruct (at 842) the audio monitor 822 to start/stop sending audio data to the audio sender 820. If the user modifies the image transparency (such as via hotkeys), the client UI 814 informs (at 844 via the transcription controller 812) the image generator 810 to generate an image of the transcription 400 based on the newly changed transparency. When the user sets or modifies the translation language, the transcription controller 812 requests (at 846) the translation engine 834 to return (at 846) text in the language that has been set by the user.

2. Forward (at 848) the audio data obtained from the audio receiver 830 to the transcribe engine 832 to so as to obtain the text of the transcription 400 and then send (at 844) the text to the image generator 810 for image generation. If the user has set a translation language, the text is sent (at 846) to the translation engine 834 to generate translated text before sending the text to the image generator 810.

3. When the user uses hotkeys to enable/disable the presentation of the transcription 400, or to increase/decrease the transparency, the transcription controller 812 monitors and identifies the keyboard and mouse operations, and then sends the changes to a corresponding component for further processing. For example, if the user uses the CTRL+ALT+ arrow up keys to increase the image transparency, each time that the user presses these hotkeys, the transparency may be increased by some amount (e.g., 5%), and the changes are sent (at 844) to the image generator 810 to apply the changes. If the user uses the CTRL+ALT keys and the mouse to modify the size of the region for displaying the image on the display screen 300, the new image size is sent (at 844) to the image generator 810 for image generation, and the coordinate data is sent (at 850) to the remote display client 808 so as to display the generated image at the appropriate position on the display screen 300.

According to various embodiments, the image generator 810 is configured to receive (at 844) the text of the transcription 400 from the transcription controller 812 and then to generate an image based on the user-defined transparency, image size, etc. for presentation by the remote display client 808. The image may be regenerated at a fixed interval (for example, every 1 second) if appropriate. The image generator 810 is instructed (at 844) by the transcription controller 812 to regenerate the image of the transcription 400 to reflect changes if the user changes the image transparency, image size, or some other characteristic of the transcription 400.

The image generator 810 of some embodiments may be further configured to maintain all of the received text from the transcription controller 812 and to always generate an image using the latest text based on the image size. In some embodiments, the older text is not displayed if the image is unable to contain all of the text.

The remote display client 808 may be configured to display graphical data of the remote desktop 126, and further configured to display the image of the transcription 400 (which may be a translation) generated by the image generator 810, above the remote desktop 302 and at the selected location/side of the remote desktop 302 and display screen 300, such as depicted in FIGS. 4-6, based on the user's configuration settings 824. If the user has not specified (via the UI window 700) a region of the display screen 300 to present the transcription 400, the remote display client 808 automatically detects an unused region on the display screen 300 to display the transcription 400. If the user has specified (via the UI window 700) a region of the display screen 300 to present the transcription 400, the remote display client 808 uses that specified region on the display screen 300 to display the transcription 400.

In other embodiments, by default, the image may be displayed by the remote display client 808 on the right side (or other default location) and on top of the remote desktop 302. The remote display client 808 re-locates the image of the remote information to the correct position relative to the image/window of the remote desktop if the user resizes or moves the window of the remote desktop 302, so that the user sees the image of the remote information being displayed on the correct position on the remote desktop 302.

When the user minimizes the window of the remote desktop 302, the remote display client 808 is configured to continue to display the image of the transcription 400 at the same region of the display screen 300. This capability can be implemented in some embodiments by invoking a window-related application program interface (API) of the local OS or guest OS.

The audio receiver 830 may be configured to receive audio data from the audio sender 820 on the remote desktop 126, and then send (at 828) the audio data to the transcription controller 812 for further processing. When the user requests the enablement/disablement of the presentation of the transcription 400, the audio receiver 830 receives (at 828) the request from the transcription controller 812, and then forwards the request to the audio sender 820 for further processing.

The transcribe engine 832 of some embodiments may include a third-party library usable to convert audio to text. The translation engine 834 of some embodiments may also include a third-party library to translate a particular language to another language, and may support the translation of multiple languages (e.g., 80 languages or any other number of languages). Multiple engines 832 or 834 may be installed at the client 800 in some embodiments.

With regards to the components of the agent 802, the audio monitor 822 may be configured as a dynamic link library (DLL) that is loaded by any system processes at the agent side that may use audio, and is responsible for receiving audio data from each process and then sending (at 842) the audio data to the audio sender 820.

The audio sender 820 may be configured to send (at 840, 838, and 836, or via some other communication link/path) the audio data to the audio receiver 830 at the client 800. When the user requests the enablement/disablement of the presentation of the transcription 400, the audio sender 820 receives the request from the audio receiver 830 and then forwards (at 842) the request to the audio monitor 822, which will then start/stop sending audio data to the audio sender 820.

The remote display server 818 may be configured to send (at 852, or at 836, 854, and 856 via the virtual channels 806 and 816) the graphical data of the remote desktop 126 to the remote display client 808. The virtual channels 806 and 816 may be used for communicating (at 838) data, graphics, files, instructions, etc. between the client 800 and the agent 802.

Figure 9:
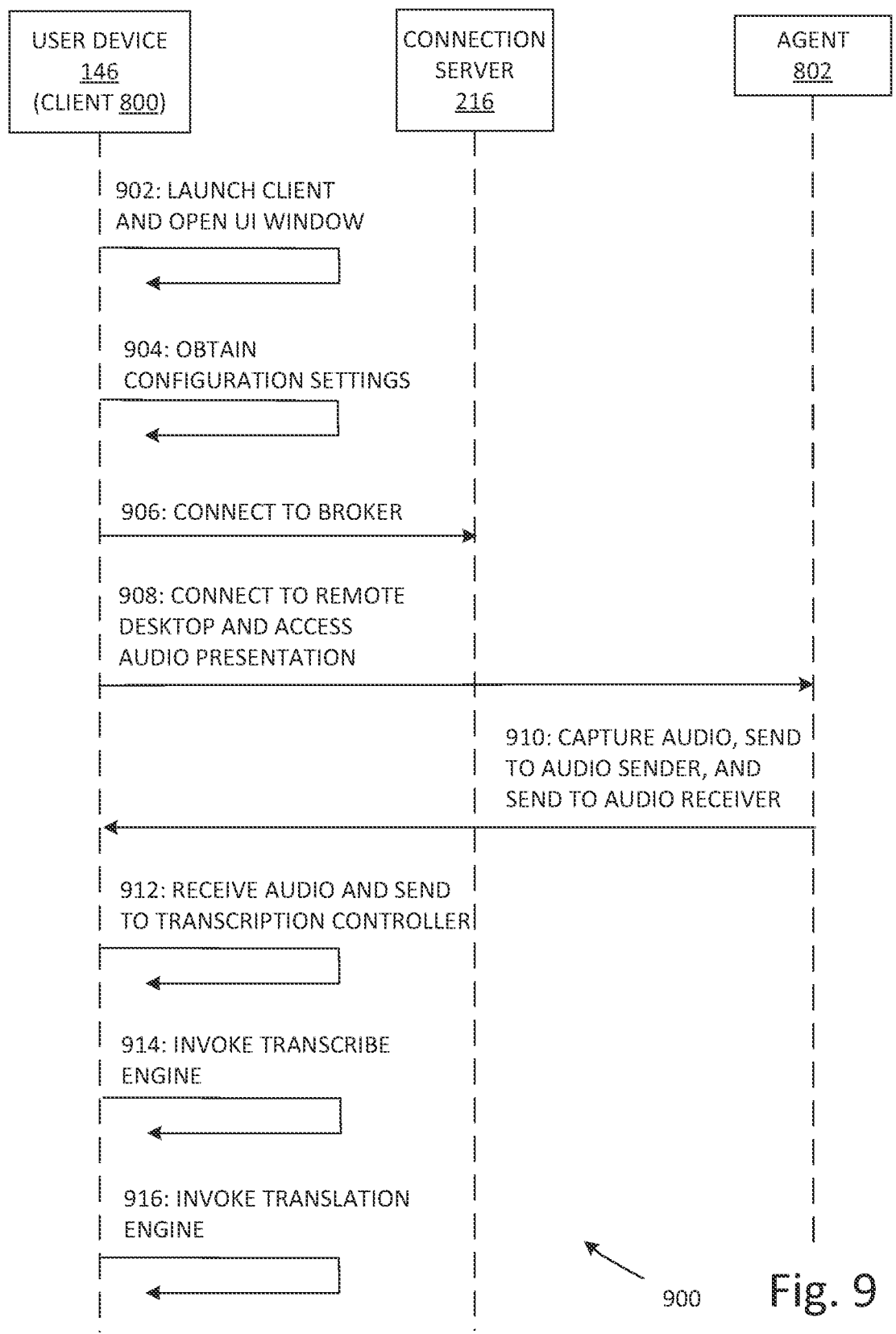
FIGS. 9 and 10 are flow diagrams of an example method to present a transcription with adjustable transparency on a display screen.
Figure 10:
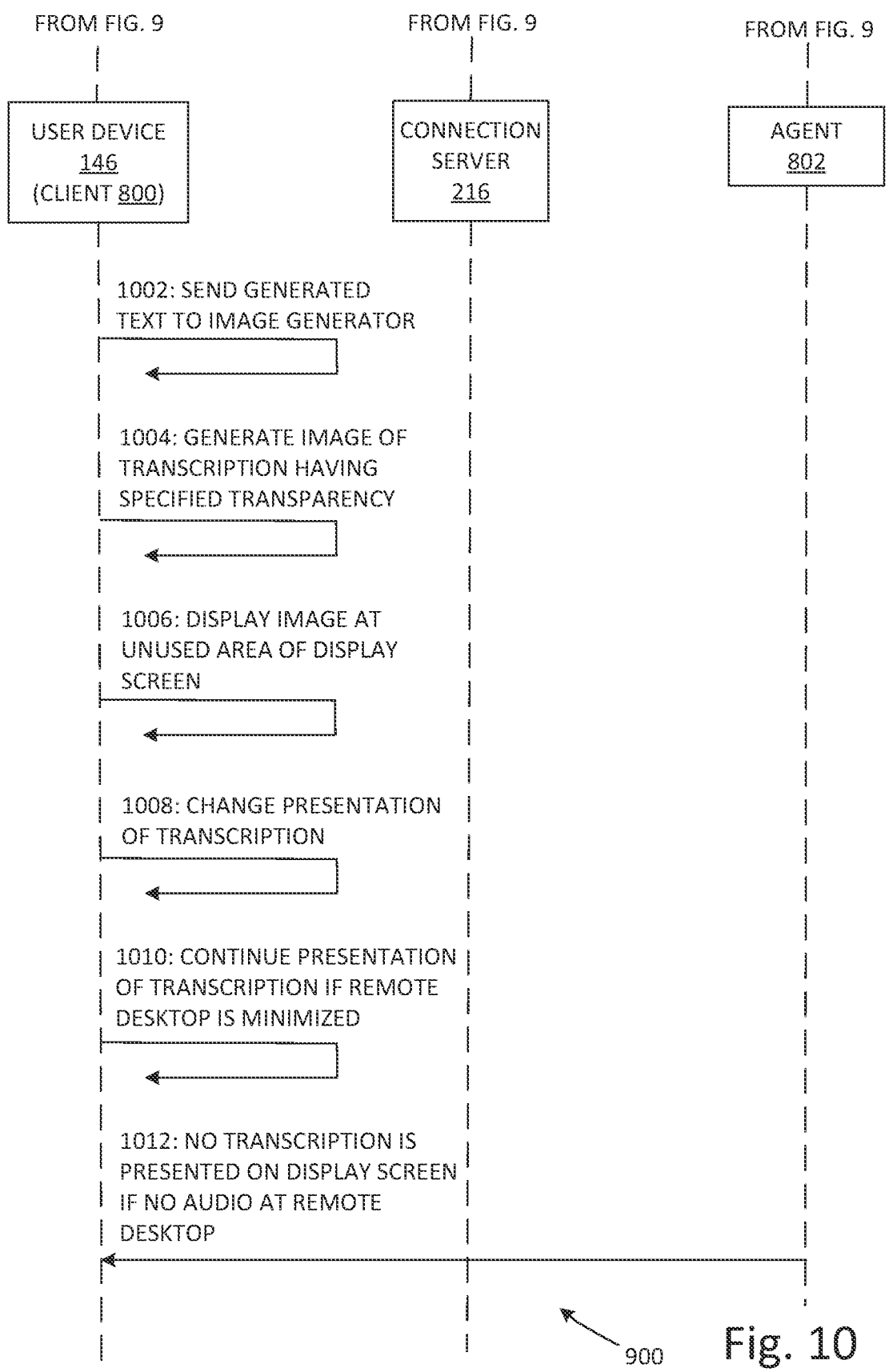

FIGS. 9 and 10 are flow diagrams of an example method 900 to present a transcription with adjustable transparency on a display screen. More specifically, the method 900 may be performed to present the transcription 400 on top of the remote desktop 302 at a particular (unused or unoccupied) area of the display screen 300, such as depicted in the examples of FIGS. 4-6.

The example method 900 may include one or more operations, functions, or actions illustrated at 902 to 1012, in which the operations of FIG. 9 continue into FIG. 10. The various operations of the method 900 and/or of any other process(es) described herein may be combined into fewer operations, divided into additional operations, supplemented with further operations, and/or eliminated based upon the desired implementation. In one embodiment, the operations of the method 900 and/or of any other process(es) described herein may be performed in a pipelined sequential manner. In other embodiments, some operations may be performed out-of-order, in parallel, etc. The operations in the method 900 are described below with reference to the various components shown in FIGS. 1-8.

According to one embodiment, the method 900 may be performed by the client 800, in cooperation with at least one agent (e.g., the agent 802) and the connection server 216 for some operations. In other embodiments, various other elements in a computing environment may perform, individually or cooperatively, the various operations of the method 900.

At 902 ("LAUNCH CLIENT AND OPEN UI WINDOW"), the client 800 is launched at the user device 146, and the user opens the UI window 700 on the (first) display screen of the user device 146 or on the (second) display screen 300 that is connected to the user device 146, so as to specify some of the configuration settings 824. For example and as previously explained above, the user may access and use the UI window 700 to provide the configuration settings 824 to the client 800, at 904 ("OBTAIN CONFIGURATION SETTINGS"), so as to enable/disable the presentation of the transcription 400 (e.g., including a translation or other type of transcription), specify a translation language, specify the transparency of the transcription 400, specify the display screen (e.g., the display screen 300) that will present the transcription 400 as an image, specify the area on the display screen 300 where the transcription 400 is to be presented, specify hotkeys, specify the size of the image of the transcription 400, etc.

At 906 ("CONNECT TO BROKER"), the client 800 connects to the connection server 216 that is operating as a broker, so as to initiate a remote desktop session between the client 800 and the agent 802, in which the remote desktop 126 is rendered on the display screen 300 as the remote desktop 302. For example, the client 800 may provide credentials to the connection server 216 to indicate that the client is entitled/authorized to access one of the remote desktops(s) provided by a VM, and then retrieves one of the remote desktops 126.

At 908 ("CONNECT TO REMOTE DESKTOP AND ACCESS AUDIO PRESENTATION"), the client 800 is connected to the remote desktop (e.g., the agent 802) via the VDI connection 208, and the remote desktop 302 is rendered on the display screen 300. At 908, the user then operates the remote desktop 302 to access an audio presentation. For example, the user may log into and attend an online meeting, or access some other live content having audio. As another example, the user may operate a multimedia player application of the remote desktop to play back video or audio (e.g., music, movies, some other type of recorded content, or any other type of multimedia, streaming audio or video, etc.).

At 910 ("CAPTURE AUDIO, SEND TO AUDIO SENDER, AND SEND TO AUDIO RECEIVER"), the audio monitor 822 at the agent 802 captures audio occurring at the remote desktop (e.g., streaming audio) and sends the audio to the audio sender 820. The audio sender 820 then sends the audio to the audio receiver 830 at the client 800.

At 912 ("RECEIVE AUDIO AND SEND TO TRANSCRIPTION CONTROLLER"), the audio receiver 830 receives the audio and checks the configuration settings 824 to verify whether the presentation of the transcription 400 is enabled. If enabled, the audio receiver 830 sends the audio to the transcription controller 812 for further processing.

At 914 ("INVOKE TRANSCRIBE ENGINE"), the transcription controller 812 invokes the transcribe engine 832 to generate a transcription (e.g., text of live audio, etc.) based on the audio received by the client 800. At 916 ("INVOKE TRANSLATION ENGINE"), the transcription controller 812 invokes the translation engine 834 to generate a translation (e.g., also as text) of the transcription generated by the transcribe engine 832, if the user has specified a translation language in the configuration settings 824 using the UI window 700 provided via the client UI 824. The method 900 then continues in FIG. 10.

At 1002 ("SEND GENERATED TEXT TO IMAGE GENERATOR"), the transcription controller 812 sends the generated text to the image generator 810. For example, the transcription controller 812 may send a transcription (which is not required to be translated) to the image generator 810, or the transcription controller 812 may send a transcription in the form of translated text to the image generator 810.

At 1004 ("GENERATE IMAGE OF TRANSCRIPTION HAVING SPECIFIED TRANSPARENCY"), the image generator 810 generates at least one image of the transcription 400. The generated image(s) may have a size, transparency, and other characteristics based on the configuration settings 824. The image generator 810 sends the generated image(s) to the remote display client 808 for displaying the image(s) at the specified area on the display screen 300, such as on top of the image of the remote desktop 302 and at an unoccupied (unused) area/region of the display screen 300.

At 1006 ("DISPLAY IMAGE AT UNUSED AREA OF DISPLAY SCREEN"), the remote display client 808 renders/displays the image(s) of the transcription 400 on top of the graphical data (image) of the remote desktop 302, at the specified or default area of the display screen 300 (such as at the right, left, center, or other unused region of the display screen 300) and at the specified transparency. In some embodiments, the remote display client 808 automatically detects an unused region of the display screen 300, and renders the image of the transcription 400 on top of the graphical data of the remote desktop at that unused region.

The user may choose to change some aspect of the presentation of the transcription 400. For example, at 1008 ("CHANGE PRESENTATION OF TRANSCRIPTION"), the user might decide to change one or more of the transparency, size, location, translation language, etc. of the transcription 400. Such change(s) may be effectuated using hotkeys, such as by the user pressing hotkeys to enable/disable the presentation of the transcription 400 or to change the transparency level, using a mouse button in conjunction with hotkeys to resize or move (e.g., drag) the region where the transcription 400 is being displayed, etc.

In other embodiments, it may be possible to provide the user with an option to independently control the size and position of the image of the transcription 400 relative to the image of the remote desktop. For example, when the user resizes (e.g., increases or reduces) or moves the image of the remote desktop, the image of the transcription 400 can be kept at the same size or the same location without following the remote desktop, or may be resized and located differently from the remote desktop.

At 1010 ("CONTINUE PRESENTATION OF TRANSCRIPTION IF REMOTE DESKTOP IS MINIMIZED"), the image generator 810 continues generating the image of the transcription 400 if the user minimizes the remote desktop 302, and so the image of the transcription 400 continues to be displayed/presented at the same or other region of the display screen 300. In some embodiments, it may be possible to provide the user with the option to discontinue displaying the transcription after the remote desktop is minimized.

At 1012 ("NO TRANSCRIPTION IS PRESENTED ON DISPLAY SCREEN IF NO AUDIO AT REMOTE DESKTOP"), no transcription is presented on the display screen 300 if no audio is occurring at the remote desktop, such as when an online meeting has ended (or has not started), when playback is paused, when a multimedia file is closed, etc. In these conditions, the audio receiver 830 is not receiving audio data from the audio sender 820.

From the embodiments disclosed herein, several benefits are realized. For example, users may view a transcription (including a translation) displayed on an unused area above the window/image of a remote desktop window when there is audio (such as an audio stream) occurring on/at the remote desktop. Furthermore, users can easily modify the location of the region of a display screen that presents the transcription and the size of the region by using hotkeys from a keyboard and mouse.

Also, users may easily adjust the transparency of the displayed transcription, and so may not be an undue distraction to the user if the user is working on other tasks. Moreover, the displayed transcription are not covered by the applications on the remote desktop—the user can always see the transcription even when the remote desktop window is minimized.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-10. For example, computing devices capable of acting as agent-side host devices or client-side user devices may be deployed in or otherwise operate in conjunction with the virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances (VCIs) may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

The invention claimed is:

1. A method to present a transcription concurrently with a remote desktop, the method comprising:
displaying the remote desktop on a display screen of a client device, wherein the display screen includes a first region where a file provided by the remote desktop is presented and a second region that is unoccupied by the file;
receiving, on the client device, audio being produced by an application executing on the remote desktop from an agent that provides the remote desktop;
generating, on the client device, the transcription of the audio being produced by the application executing on the remote desktop, wherein the transcription includes text associated with the audio;
presenting an image of the transcription at the second region of the display screen while applying a transparency level to the image of the transcription, wherein the image is continuously updated to display the text associated with the audio being produced by the application executing on the remote desktop;
detecting that the application executing on the remote desktop has stopped producing the audio; and
discontinuing the presentation of the image of the transcription at the second region of the display screen on the client device.

2. The method of claim 1, wherein an image of the remote desktop fully occupies the display screen, and wherein the image of the transcription is presented at the second region on top of the image of the remote desktop.

3. The method of claim 1, wherein the text included in the transcription comprises one or more of: text of the audio which is live audio, a text translation of the audio, text of the audio which is provided via streaming, text of the audio which is provided by a multimedia file, or text of the audio which is recorded audio being played back.

4. The method of claim 1, further comprising:
providing a user interface (UI) window to configure the presentation of the transcription at the second region by the client device, including specifying at least one of: the transparency level of the transcription, hotkeys to adjust the transparency level, or a translation language for the text included in the transcription; and
notifying the agent of enablement of the presentation of the transcription so as to cause the agent to capture the audio and to send the audio to the client device.

5. The method of claim 1, further comprising:
moving or resizing the image of the transcription being presented; and
adjusting the transparency level of the image of the transcription.

6. The method of claim 1, further comprising continuing to present the image of the transcription after the remote desktop is minimized while the application executing on the remote desktop is producing the audio.

7. A non-transitory computer-readable medium having instructions stored thereon, which in response to execution by one or more processors, cause the one or more processors to perform a method to present a transcription concurrently with a remote desktop, wherein the method comprises:
displaying the remote desktop on a display screen of a client device, wherein the display screen includes a first region where a file provided by the remote desktop is presented and a second region that is unoccupied by the file;
receiving, on the client device, audio being produced by an application executing on the remote desktop from an agent that provides the remote desktop;
generating, on the client device, the transcription of the audio being produced by the application executing on the remote desktop, wherein the transcription includes text associated with the audio;
presenting an image of the transcription at the second region of the display screen while applying a transparency level to the image of the transcription, wherein the image is continuously updated to display the text associated with the audio being produced by the application executing on the remote desktop;
detecting that the application executing on the remote desktop has stopped producing the audio; and
discontinuing the presentation of the image of the transcription at the second region of the display screen on the client device.

8. The non-transitory computer-readable medium of claim 7, wherein an image of the remote desktop fully occupies the display screen, and wherein the image of the transcription is presented at the second region on top of the image of the remote desktop.

9. The non-transitory computer-readable medium of claim 7, wherein the text included in the transcription comprises one or more of: text of the audio which is live audio, a text translation of the audio, text of the audio which is provided via streaming, text of the audio which is provided by a multimedia file, or text of the audio which is recorded audio being played back.

10. The non-transitory computer-readable medium of claim 9, wherein the method further comprises:
moving or resizing the image of the transcription being presented; and
adjusting the transparency level of the image of the transcription.

11. The non-transitory computer-readable medium of claim 7, wherein the method further comprises:
providing a user interface (UI) window to configure the presentation of the transcription at the second region by the client device, including specifying at least one of: the transparency level of the transcription, hotkeys to adjust the transparency level, or a translation language for the text included in the transcription; and
notifying the agent of enablement of the presentation of the transcription so as to cause the agent to capture the audio and to send the audio to the client device.

12. The non-transitory computer-readable medium of claim 7, wherein the method further comprises continuing to present the image of the transcription after the remote desktop is minimized while the application executing on the remote desktop is producing the audio.

13. A computing device, comprising:
a processor; and
a non-transitory computer-readable medium coupled to the processor and having instructions stored thereon, which in response to execution by the processor, cause the processor to perform operations to present a transcription concurrently with a remote desktop, wherein the operations comprise:
display the remote desktop on a display screen of the computing device, wherein the display screen includes a first region where a file provided by the remote desktop is presented and a second region that is unoccupied by the file;
receive audio being produced by an application executing on the remote desktop from an agent that provides the remote desktop;
generate, on the computing device, the transcription of the audio being produced by the application on the remote desktop, wherein the transcription includes text associated with the audio;
present an image of the transcription at the second region of the display screen while applying a transparency level to the image of the transcription, wherein the image is continuously updated to display the text associated with the audio being produced by the application on the remote desktop;
detect that the application executing on the remote desktop has stopped producing the audio; and
discontinue the presentation of the image of the transcription at the second region of the display screen on the computing device.

14. The computing device of claim 13, wherein an image of the remote desktop fully occupies the display screen, and wherein the image of the transcription is presented at the second region on top of the image of the remote desktop.

15. The computing device of claim 13, wherein the text included in the transcription comprises one or more of: text of the audio which is live audio, a text translation of the audio, text of the audio which is provided via streaming, text of the audio which is provided by a multimedia file, or text of the audio which is recorded audio being played back.

16. The computing device of claim 15, wherein the operations further comprise:
provide a user interface (UI) window to configure the presentation of the transcription at the second region by the computing device, including specifying at least one of: the transparency level of the transcription, hotkeys to adjust the transparency level, or a translation language for the text included in the transcription; and
notify the agent of enablement of the presentation of the transcription so as to cause the agent to capture the audio and to send the audio to the client computing device.

17. The computing device of claim 13, wherein the operations further comprise:
move or resize the image of the transcription being presented; and
adjust the transparency level of the image of the transcription.

18. The computing device of claim 13, wherein the operations further comprise:
continue to present the image of the transcription after the remote desktop is minimized while the application executing on the remote desktop is producing the audio.

* * * * *